United States Patent Office 2,807,343
Patented Sept. 24, 1957

2,807,343

DRIVING ARRANGEMENTS OF THE WORK-SPINDLES OF AUTOMATIC MACHINE TOOLS

Richard Dudley George Ryder, Horwich, and Henry Myers, Bolton, England, assignors to Thomas Ryder & Son Limited, Bolton, England, a British company Application March 18, 1955, Serial No. 495,246

Claims priority, application Great Britain March 31, 1954

3 Claims. (Cl. 192—53)

This invention relates to automatic machine tools comprising a number of workspindles (each having a chuck or like workholding device thereon) mounted in a rotary table which at the completion of each cutting cycle is caused to turn or index an amount equal to the pitch of the workspindles, so that each of the latter is presented to each tool station in succession. In one complete turn of the table, a workpiece on a workspindle is completely machined. Before the workpiece can be indexed at the completion of each cutting cycle, each of the workspindles must be disengaged from the driving mechanism. After indexing, the workspindles must be accelerated from rest, synchronised and positively re-engaged with the driving mechanism.

The object of the present invention is to provide improved means for driving the workspindles which effects the desired acceleration, synchronisation and positive drive of the workspindles.

The invention consists in a machine tool of the type specified in which each workspindle is driven through clutch members operated hydraulically and relatively slowly to accelerate and synchronise the workspindle and its driving member and then relatively rapidly to establish a positive drive between said parts, the drive being disengaged relatively rapidly.

The invention further comprises a machine tool as aforesaid in which the drive to the workspindle is effected through a spring loaded synchronising clutch member which is moved to the synchronising position and then has its rate of movement slowed down whilst synchronism is attained and after synchronism has its rate of movement speeded up whilst it moves to a position in which the driving and driven parts are positively engaged with one another.

The invention further comprises a machine tool as aforesaid in which the hydraulic fluid is supplied through a fixed piston rod to a movable cylinder (around the rod) at a position beneath a flange or collar on the piston rod, the cylinder having an internal flange or collar which moves into line with the other flange or collar to restrict the flow of hydraulic fluid into the cylinder when the clutch members are accelerating the workspindle to a synchronous speed, the said flanges or collars then moving out of line to allow the hydraulic fluid to move the cylinder quickly to cause dog clutch teeth on the driving and driven parts to engage.

The invention further comprises a machine tool as aforesaid in which a passage extends from the piston rod into the cylinder to a point above the flange or collar on the piston rod with a spring loaded valve preventing flow through said passage into the cylinder whilst permitting flow from the cylinder into the piston rod in order to permit a rapid emptying of the cylinder when the drive to the workspindle is to be disengaged.

The invention further comprises a machine tool as aforesaid in which the piston rod extends through the cylinder and has a spring therearound which bears at one end upon the end of the cylinder and at the other end upon a part of the piston rod, the spring tending to force the cylinder to discharge its fluid contents back through the piston rod.

Referring to the accompanying explanatory drawings.

Figure 3:
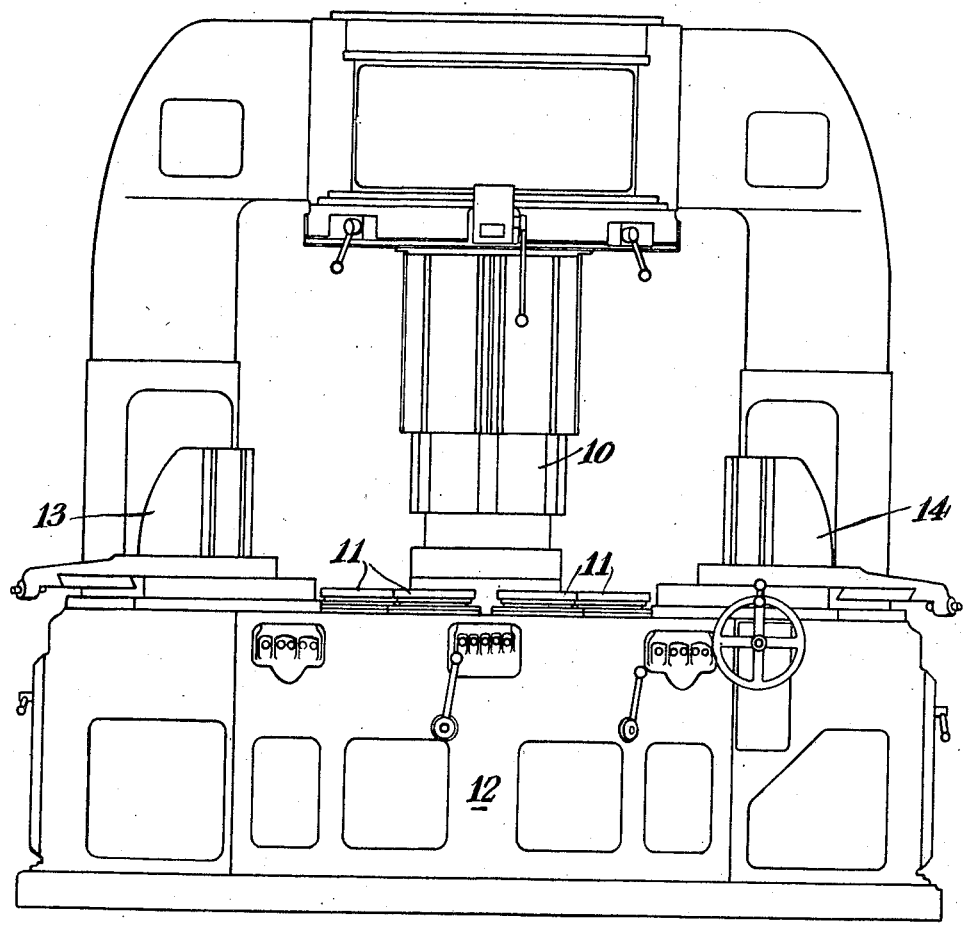
Figure 3 is a general view of a machine of the type to which the invention relates.

In Figure 3, 10 indicates the column on which are carried the usual tool slides with tools for operating on the workpieces in chucks 11 on the work carrying spindles.

There is a worktable within the base 12, the workspindles being mounted and revolving in the worktable. The latter is indexed or turned so that a workpiece which has made one complete revolution with the worktable around the column 10 can be removed and replaced by a new workpiece. The machine may have side tool heads at 13 and 14.

Figure 1:
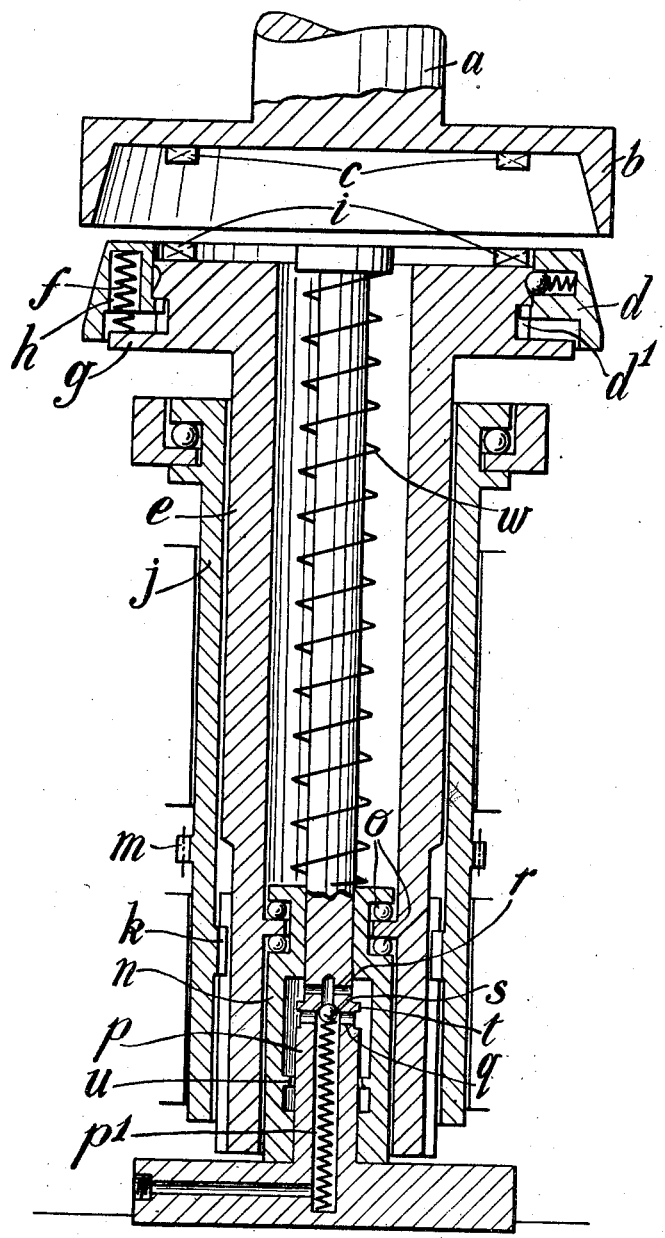
Figure 1 is a sectional elevation showing one form of the improved workspindle drive, the drive being in its disengaged position.
Figure 2:
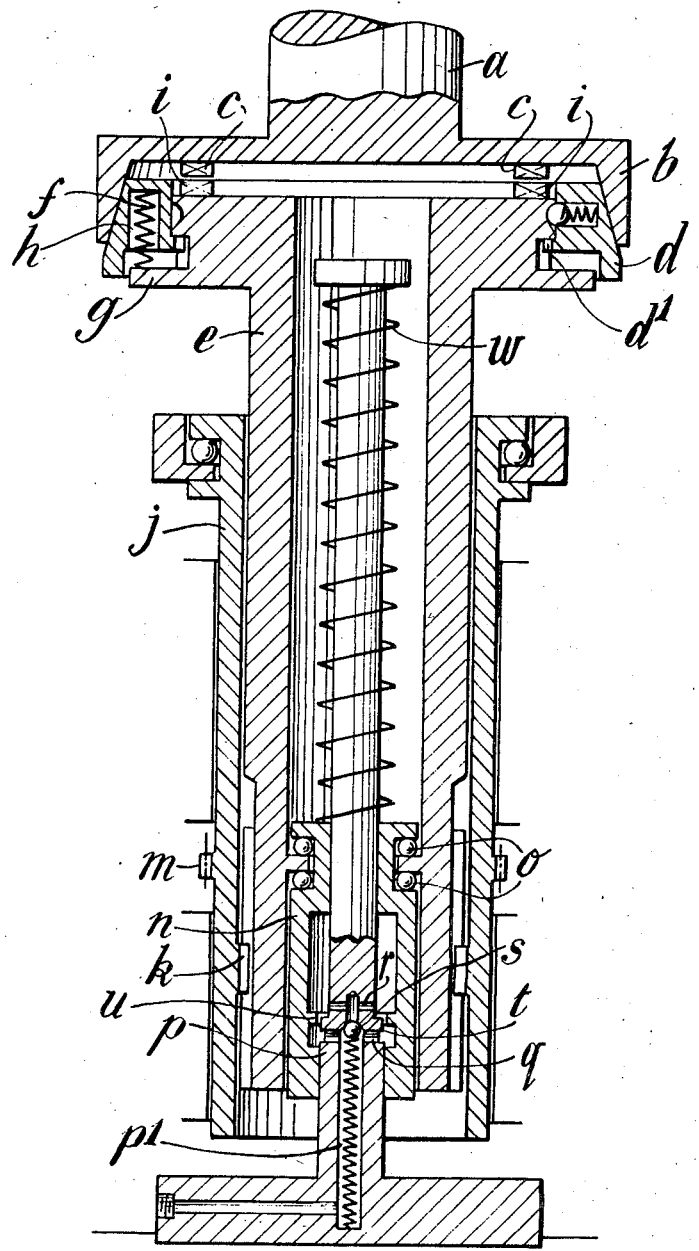
Figure 2 is a view similar to Figure 1 but showing the drive in an intermediate position where the workspindle is being accelerated and synchronised before being positively clutched to its driving member.

As seen in Figs. 1 and 2, each workspindle $a$ has an internally coned clutch member $b$ thereon and it has also dog clutch teeth $c$ therein. The conical face of the clutch member $b$ is adapted to be engaged by an externally coned clutch member $d$ which is keyed at $d^1$ to a hollow driving spindle $e$ and is loaded by springs as $f$ which bear upon a flange $g$ on the spindle $e$ and are located in pockets $h$ in the clutch member $d$. There are dog clutch teeth $i$ on the end of the driving spindle $e$ which can engage the similar teeth $c$ on the workspindle $a$.

The spindle $e$ is driven by the sleeve $j$ to which it is keyed at $k$ and the sleeve $j$ is driven at $m$ by suitable gearing (not shown).

Within the hollow driving spindle $e$ is located a hydraulic cylinder $n$, the spindle and cylinder being interconnected through thrust bearings $o$ as shown. The piston $p$ which extends through the cylinder $n$ is a fixture and has an axial passage $p^1$ therethrough for the inflow and outflow of hydraulic fluid and two sets of radial ports $q$ and $r$ leading from such axial passage $p$ into the cylinder $n$. Flow from the axial passage $p^1$ to the ports $r$ is prevented by the spring loaded ball valve $s$ which however permits flow in the opposite direction, that is from the radial ports $r$ to the axial passage $p^1$. There is a flange or collar $t$ on the piston $p$ between the two sets of ports $q$ and $r$ and there is an internal flange or collar $u$ on the cylinder $n$ which co-operates with the said flange or collar $t$ in the manner hereinafter described.

It will be appreciated that the drives to the several workspindles are controlled in synchronism by a valve controlling the flow of hydraulic fluid to the passages $p^1$.

If the workspindle $a$ is to be revolved, hydraulic fluid is admitted to the passage $p^1$ and passes via the radial ports $q$, see Figure 1, to the cylinder $n$ which is raised and carries with it the hollow spindle $e$ which through the springs as $f$ applies pressure to the clutch member $d$ driven by the spindle $e$. Such clutch member $d$ then engages the clutch member $b$ and commences to drive and accelerate the latter and so the workspindle $a$. This is the position shown in Figure 2 and it will be noted that the two flanges or collars $t$ and $u$ are now moving over one another and restricting the flow of hydraulic fluid to the cylinder $c$ so that its lifting movement is slowed down, which enables synchronism to be obtained between the rates of rotary movement of the clutch members $d$ and $b$, before the spindle $e$ is raised to the point at which its dog clutch teeth $i$ engage the dog clutch teeth $c$ on the clutch member and establish a positive drive between the parts. When synchronism has been established and the flanges or collars $t$ and $u$ pass clear of one another, there is a full flow of hydraulic fluid into the cylinder $n$ so that the final movement of the clutch member $d$, after such synchronism, is a rapid one.

When the drives to the workspindles are to be stopped, the passage $p^1$ is placed in communication with exhaust and as the hydraulic fluid in the cylinder $n$ can force open the valve $s$, the flanges or collars $t$ and $u$ become inoperative and there is a rapid exhaustion of the cylinder $n$ due to the pressure of the spring $w$ thereon until the Figure 1 position of the parts is restored. It will be seen that clutch engagement is accomplished by hydraulic pressure and disengagement by spring pressure.

Indexing of the table (not shown) having therein the workholders on the workspindles $a$ can then be effected.

What we claim is:

1. In a clutch comprising coaxial engaging means, one of which is movable axially to engage and disengage the other, said movable engaging means being mounted on a hollow shaft, a stationary piston comprising a portion of large and a portion of lesser diameter so a shoulder is formed at their juncture, said piston extending into said hollow shaft and coaxial therewith, a hydraulic cylinder within said hollow shaft and surrounding said piston for axial movement thereon, a thrust bearing connection between said hollow shaft and said hydraulic cylinder, an axial passage in said piston for inflow of hydraulic fluid to move said cylinder along said piston to engage the clutch, radial ports in said larger portion of said piston connecting said axial passage with said hydraulic cylinder, and at least one inwardly extending flange in said cylinder of such diameter that as it passes over said ports the speed of travel of said cylinder on said piston is reduced and as it passes said shoulder the speed of travel is resumed.

2. A hydraulic actuating means for a synchronizing clutch comprising a movable hydraulic cylinder, a stationary piston comprising a large diametered and a smaller diametered portion extending completely through said cylinder, an axial passage for hydraulic fluid in the larger diametered portion of said piston to a point adjacent its juncture with said smaller diametered portion, radial ports in the larger diametered portion of said piston connecting said axial passage with the interior of said cylinder, and an inwardly extending flange in said cylinder whereby the relative speed of movement between cylinder and piston, under the influence of hydraulic fluid supplied under pressure through said passage to move said cylinder relative to said piston, will be reduced during the time that the flange lies between said radial ports and said smaller diametered portion and the relative speed will again increase when said flange lies over said smaller diametered portion.

3. The device of claim 2, in which said axial passage is provided with an extension passage of somewhat smaller diameter extending into said smaller diametered portion of said piston, radial passages connecting said extension passage with the interior of said cylinder through the wall of the smaller diametered portion of said piston, and a check valve between said axial passage and said extension passage whereby when the axial passage is vented hydraulic fluid may pass through said extension into said axial passage.

References Cited in the file of this patent

UNITED STATES PATENTS

| | | |
|---|---|---|
| 1,911,632 | Lewis | May 30, 1933 |
| 2,078,173 | Brewer | Apr. 20, 1937 |
| 2,388,857 | Lindsley | Nov. 13, 1945 |
| 2,633,954 | Allen | Apr. 7, 1953 |
| 2,710,086 | Stahl | June 7, 1955 |